United States Patent
Levy et al.

(10) Patent No.: US 6,971,726 B2
(45) Date of Patent: Dec. 6, 2005

(54) AUTOMATIC STABILITY CONTROL SYSTEM FOR A VEHICLE USING AN INVARIANT CHARACTERIZING ANY TIRE

(75) Inventors: Georges Levy, Tokyo (JP); Nicolas Fangeat, Chamalieres (FR)

(73) Assignee: Michelin Recherche et Technique S.A., Granges-Paccot (CH)

(*) Notice: Subject to any disclaimer, the term of this patent is extended or adjusted under 35 U.S.C. 154(b) by 65 days.

(21) Appl. No.: 10/461,628

(22) Filed: Jun. 13, 2003

(65) Prior Publication Data
US 2004/0032165 A1 Feb. 19, 2004

(30) Foreign Application Priority Data
Jun. 13, 2002 (FR) .............................. 02 07398
Jul. 29, 2002 (FR) .............................. 02 09628

(51) Int. Cl.⁷ .............................................. B60T 8/60
(52) U.S. Cl. ................... 303/150; 180/197; 303/20; 701/90
(58) Field of Search .................... 303/20, 199, 150, 303/148–149, 163–165, 191, 146, 122.03; 73/146, 9; 701/80, 72, 79, 90, 82, 71, 83, 86; 180/197; 702/105, 42; 700/80, 32, 73, 57; 188/181 A

(56) References Cited

U.S. PATENT DOCUMENTS

| | | | |
|---|---|---|---|
| 3,980,346 A | 9/1976 | Leiber | 303/6 |
| 5,402,345 A | 3/1995 | Kost | 364/426.02 |
| 5,641,212 A | 6/1997 | Sakai | 303/147 |
| 5,816,666 A | 10/1998 | Wiss | 303/113.4 |
| 6,449,542 B1 | 9/2002 | Böttiger et al. | 701/41 |
| 2001/0056317 A1 | 12/2001 | Nishizaki et al. | |
| 2004/0024514 A1 * | 2/2004 | Levy et al. | 701/82 |
| 2004/0032165 A1 * | 2/2004 | Levy et al. | 303/150 |
| 2004/0049303 A1 * | 3/2004 | Levy et al. | 700/80 |

FOREIGN PATENT DOCUMENTS

| | | |
|---|---|---|
| DE | 4329745 | 7/1994 |
| DE | 4435448 | 4/1995 |
| DE | 10128675 | 1/2002 |
| EP | 0716948 | 11/1995 |
| EP | 0829401 | 8/1997 |
| EP | 1000838 | 1/1999 |
| EP | 001371534 A1 * | 12/2003 |
| FR | 2840867 * | 12/2003 |
| WO | 9205986 | 4/1992 |

* cited by examiner

Primary Examiner—Douglas C. Butler
(74) Attorney, Agent, or Firm—Fitzpatrick, Cella, Harper & Scinto

(57) ABSTRACT

A system is presented for controlling the stability of a vehicle. The system includes a controller using a slip parameter $G_{OPT}$ corresponding to a predetermined value of the coefficient of friction $\mu$ or a controller maintaining the functioning of the tire at an optimal value $\delta^{OPT}$ of the drift angle corresponding to the maximum value of the draft thrust $F_{target}$. The controller performs the following operations (where X is either the slip G or the drift angle $\delta$, and Y is either $\mu$ or F). Estimations or measurements are determined for at least one pair of values $(X_i, Y_i)$. The corresponding values of the slope $\alpha_i$ are determined for the straight line passing through the origin $(X_i, Y_i)$. Coefficients $A_p$ are calculated by direct calculation or by a regression from a sufficient number of pairs with $(\alpha_i, X_i)$ so as to model a variation curve $\alpha_i = f(X_i, A_p)$. A target value $X^{Target}$ is calculated by using a predetermined invariant "Invt".

32 Claims, 8 Drawing Sheets

AUTOMATIC STABILITY CONTROL SYSTEM FOR A VEHICLE USING AN INVARIANT CHARACTERIZING ANY TIRE

BACKGROUND OF THE INVENTION

Technical Field of the Invention

The invention relates to the systems for controlling the stability of a vehicle, more particularly in their function aimed at avoiding locking of the wheels when the brakes are applied, popularly known-by the term "ABS", but also in their more sophisticated versions aimed at maintaining the vehicle on a stable path by automatically acting on the brakes of one wheel, such as for example in the systems popularly known by the term "ESP", or by acting on any other actuator (four wheels steering, active anti-roll, . . . ).

It is known that the braking of a vehicle will be all the more efficient if the tread is made to function at a slip G corresponding to the maximum value of the coefficient of friction. The maximum value of the coefficient of friction is called $\mu_{max}$. But the average driver is not capable of controlling the braking so as to meet this condition.

SUMMARY OF THE INVENTION

One aim of the present invention is to predict the slip associated with the maximum coefficient of friction $\mu_{max}$ during braking (or under driving force), depending on the actual rolling conditions of the tire under consideration, by means of measurements as simple as possible to acquire on the vehicle, and by means of as small a number of measurements as possible.

The present invention is based on the observations detailed below, enabling the existence of an Invariant to be identified, that is to say, a parameter having a constant value independent both of the tires and of the grounds on which they are used.

According to a first aspect, the invention relates to a system for controlling the stability of a vehicle, including means for imparting a longitudinal force to a tire intended to roll on the ground, means for modulating the longitudinal force, and comprising a controller using at least the parameter slip $G^{Opt}$ corresponding to a predetermined value of the coefficient of friction $\mu$, the controller including means for calculating the parameter(s) as follows:

On each activation of the means for imparting a longitudinal force to the tire, for at least two different levels "i" of the longitudinal force, each corresponding to one slip $G_i$, on condition that there is no loss of grip, determining the values of the coefficient of friction $\mu_i$, Determining the slope $\alpha_i$ of the straight line passing through the origin and through ($G_i$, $\mu_i$), Calculating coefficients $A_p$ by direct calculation or by an appropriate regression from a sufficient number of pairs with ($\alpha_i$, $G_i$) so as to model a variation curve $\alpha_i = f(G_i, A_p)$, Calculating the optimum slip $G^{Opt}$ by using a predetermined Invariant "Invt", Acting on the means for imparting a longitudinal force to the tire so as to maintain the slip at its optimum value $G^{Opt}$.

The coefficient of friction may, in the present invention, be estimated as indicated above, or of course in any other way, for example from measurements carried out in the tire or its environment. A modelling (above-mentioned variation curve) of the functioning of the tire in terms of slip is thus obtained, which may find application relating to the control of the slip at a predetermined optimum level, in particular for example to the control of the slip corresponding to the maximum grip of the tire, and applicable as already emphasised both to situations in which the longitudinal force transmitted by the tire is a braking force and to situations in which the longitudinal force transmitted by the tire is a driving force.

It should be noted that, in the context of the present invention, it does not matter whether the tread whose grip characteristic is being dealt with is that of a pneumatic tire or a non-pneumatic elastic outer casing, or else a crawler track. The terms "tread", "tire", "outer casing", "elastic outer casing", "crawler track" or even "wheel" are to be interpreted as equivalent.

In another preferred application, the invention relates to the analysis of the lateral force developed by a tire or elastic outer casing working on a vehicle in a region of functioning close to the saturation of the lateral force.

Consequently, according to a second aspect, the invention relates to a system for controlling the stability of a vehicle having at least one tire intended to roll on the ground, the vehicle being equipped with a system for controlling a selected parameter <<λ>> depending on the commands imparted by the vehicle driver to his control means and depending on the commands delivered by a path controller aimed at maintaining the functioning of the tire at a predetermined target value of the drift thrust $F_{target}$, the path controller using at least one optimum value $\delta^{Opt}$ of the drift angle corresponding to the maximum value of the drift thrust $F_{target}$, the said controlling including means for performing the following operations:

On each activation of the system controlling said parameter <<λ>>, for at least two different levels "i" of the drift angle δ, recording various values of $F_{Yi}$, and the estimated or measured drift angle $\delta_i$, Determining the slope $\alpha_i$ of the straight line passing through the origin and through ($\delta_i$, $F_{Yi}$), Calculating coefficients $A_p$ by direct calculation or by an appropriate regression from a sufficient number of pairs with ($\alpha_i$, $\delta_i$) so as to model a variation curve $\alpha_i = f(\delta_i, A_p)$, Calculating the optimum drift angle value $\delta^{Opt}$ associated with the maximum value of the drift thrust $F_{target}$ by using a predetermined Invariant "Invt";

Producing a warning signal when the drift angle δ is close to $\delta^{Opt}$.

The invention concerns the systems for controlling the stability of a vehicle. This refers both to the function aimed at avoiding the locking of the wheels when the brakes are applied, popularly known by the term "ABS", or else aimed at automatically increasing the brake force as far as the physically possible limit, and also more sophisticated versions of the system for controlling the stability of a vehicle aimed at maintaining the vehicle on a stable path by automatically and selectively acting on the brakes of one wheel and/or by automatically and selectively acting on the steering of one or several wheels or on any other actuator enabling the behaviour of the vehicle to be influenced.

BRIEF DESCRIPTION OF THE DRAWINGS

The invention will be explained in more detail below with reference to the attached figures, in which.

DETAILED DESCRIPTION OF EXEMPLARY EMBODIMENTS

The present invention is based on the following observations.

Figure 4:
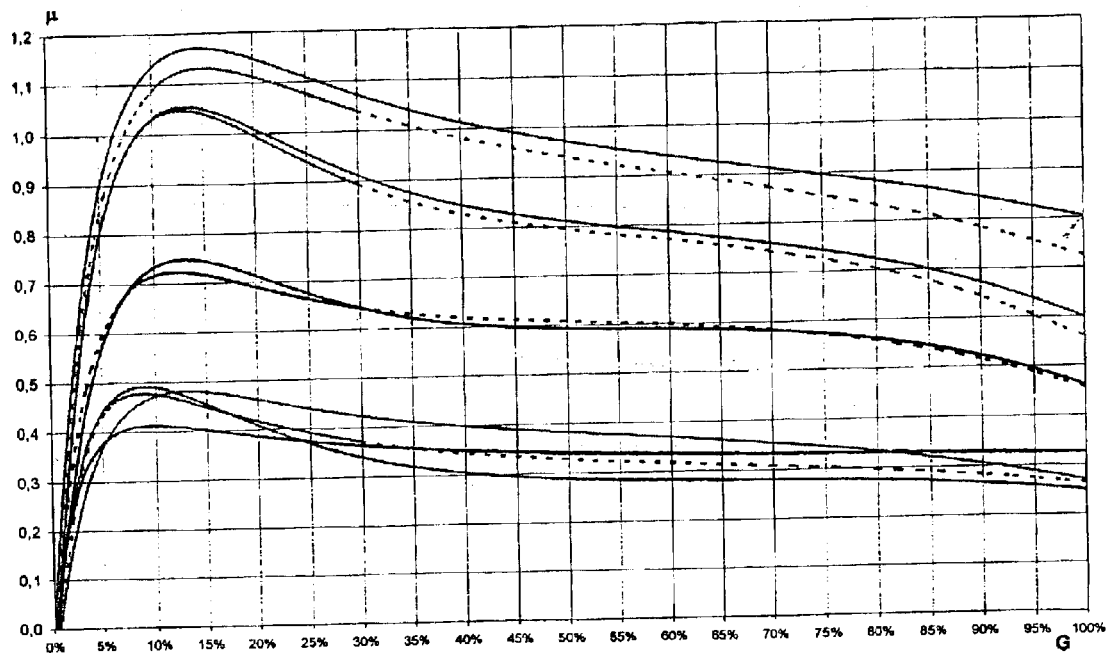
FIG. 4 shows several plots of the variation of the coefficient of friction μ with respect to the slip G for the same tire under various test conditions.
Figure 5:
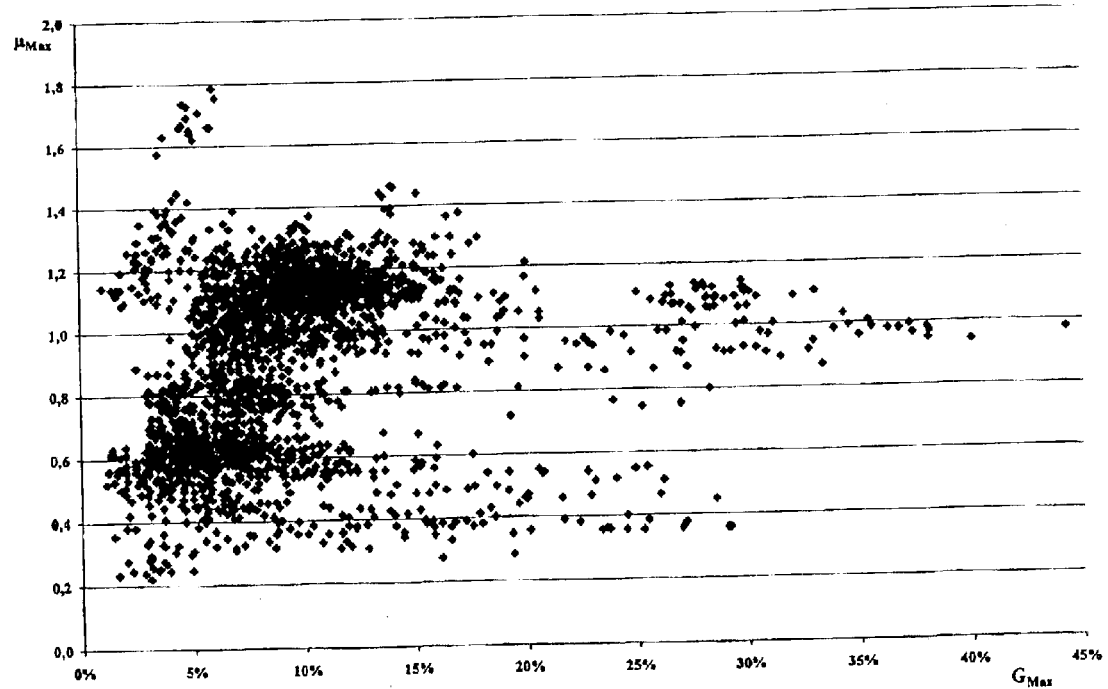
FIG. 5 shows the position of the coefficients of friction $\mu_{max}$ and of the associated slips $G_{max}$ for numerous tires and different test conditions.

FIG. 4 shows various curves of the coefficient of friction μ as a function of the slip G for the same MICHELIN XH1 195/65-15 tire tested on various grounds at an inflation pressure of 2 bars. FIG. 5 shows the location of the coefficients of friction $\mu_{max}$ and the corresponding slip $G_{max}$, for a very large number of tests corresponding to different tires, different grounds and different test conditions in terms of speed, tire load, etc. It can be seen that it is difficult, if not illusory, to find a regression enabling the physical phenomena of grip to be grasped correctly using such an approach, since the values are widely scattered.

Figure 6:
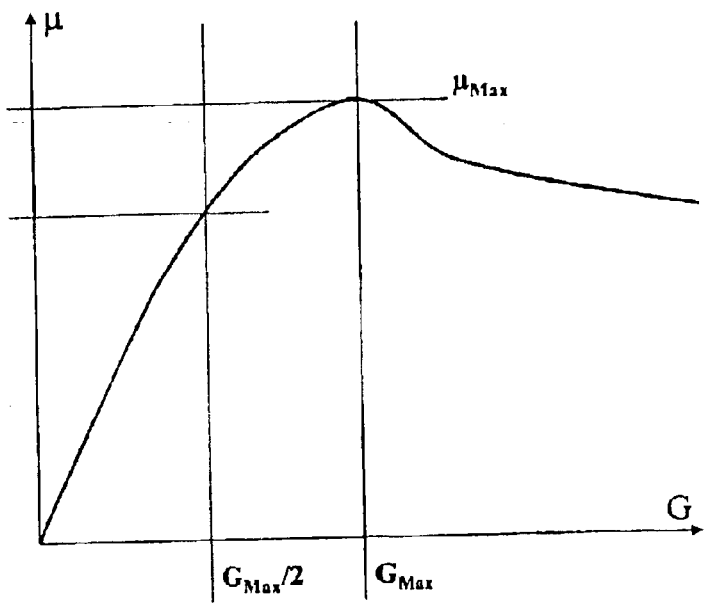
FIG. 6 shows a typical schematic curve of the variation of the coefficient of friction μ with respect to the slip G, in which two particular points have been marked: the coefficient of friction $\mu_{max}$ and its associated slip $G_{max}$, and the point corresponding to the coefficient of friction $\mu_{50\%}$, prevailing to 50% of the slip $G_{max}$, marked by $G_{max/2}$.

The applicants have therefore pursued their investigations in a manner which will be explained. Analysis of the quotient μ/G calculated for $G=G_{max}$ and for $G=G_{max}/2$, also denoted "50%", (see FIG. 6) is carried out.

Figure 7:
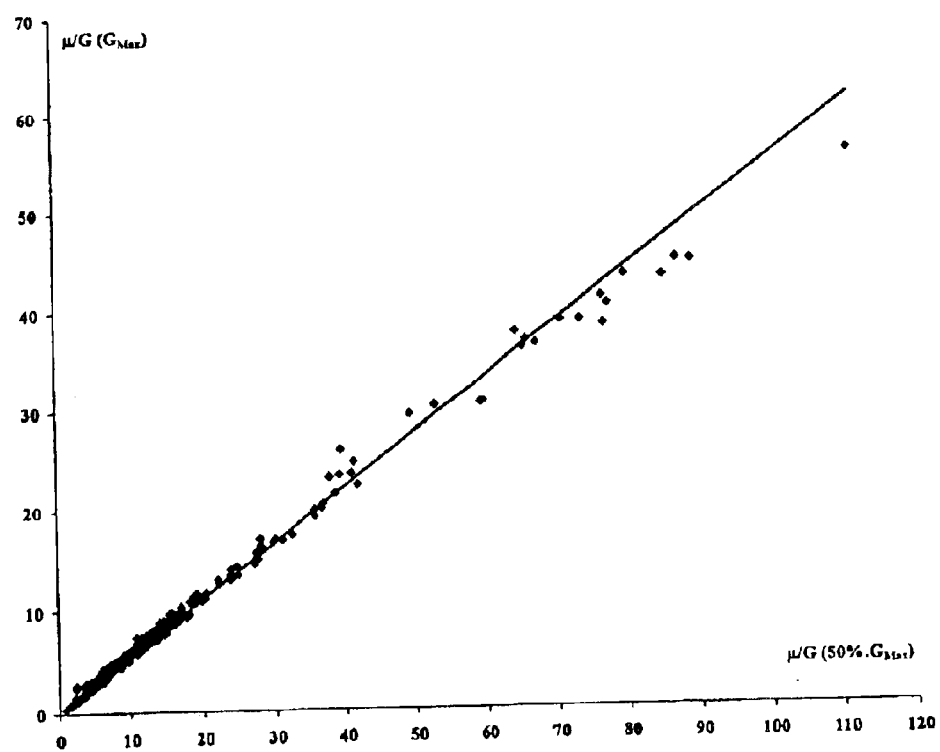
FIG. 7 shows the position of the points corresponding, in ordinates, to the quotient μ/G (at $G_{max}$) of the coefficient of friction $\mu_{max}$ for the slip associated with the coefficient of friction $\mu_{max}$ and quotients μ/G (at 50% of $G_{max}$) of the value of the coefficient of friction at and for the slip at 50% of the slip associated with the coefficient of friction $\mu_{max}$, for numerous tires and different test conditions.

FIG. 7 shows the values of the ratio $\mu_{max}/G_{max}$ as a function of the ratio $\mu/G_{at\ 50\%\ of\ max}$ for about 400 tests, i.e., 3000 measurements in total before determining a mean value. FIG. 7 reflects multiple ground conditions and different tires, and test conditions (load, speed, pressure) which are themselves variable. It enables an appreciation to be gained of the excellent experimental verification of the Invariant "Invt" presented above.

It is found that, whatever the tires under consideration and the test conditions are:

$$\frac{\frac{\mu}{G}(G = G_{\max})}{\frac{\mu}{G}(G = G_{\max}/2)} \approx 0.58 \qquad \text{Eq. (1)}$$

The above ratio is an Invariant denoted "Invt" herein below.

Figure 8:
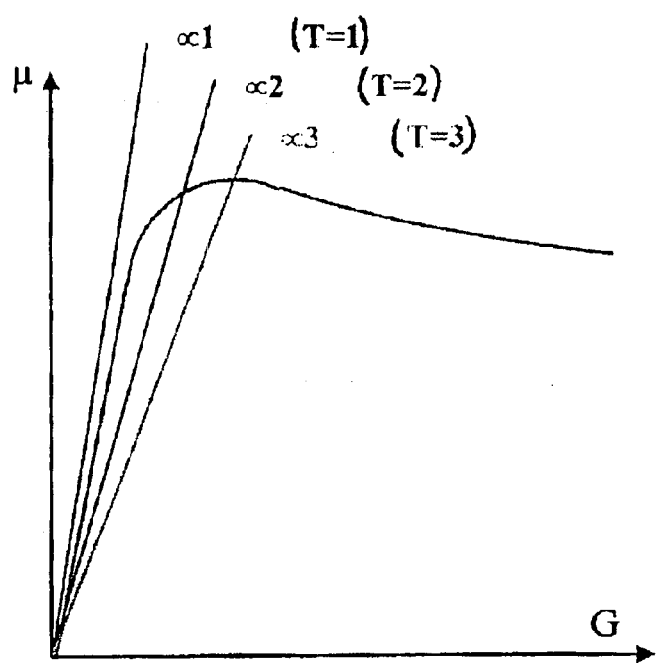
FIG. 8 shows a typical schematic curve of the variation of the coefficient of friction μ with respect to the slip and shows the course of the secant a passing through the origin and the curve for three particular slips.

Next, the mean slope of the curve μ(G) (see FIG. 8) is considered. Let us call this slope α. It holds that:

$$\mu = \alpha \cdot G \qquad \text{Eq. (2)}$$

Figure 9:
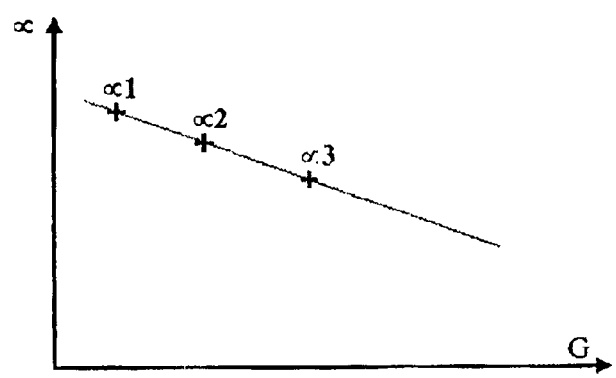
FIG. 9 shows a typical schematic curve of the linear variation as a function of the slip G of the slope of the secant α passing through the origin and the point of the curve of the variation of the coefficient of friction at the same slip.
Figure 10:
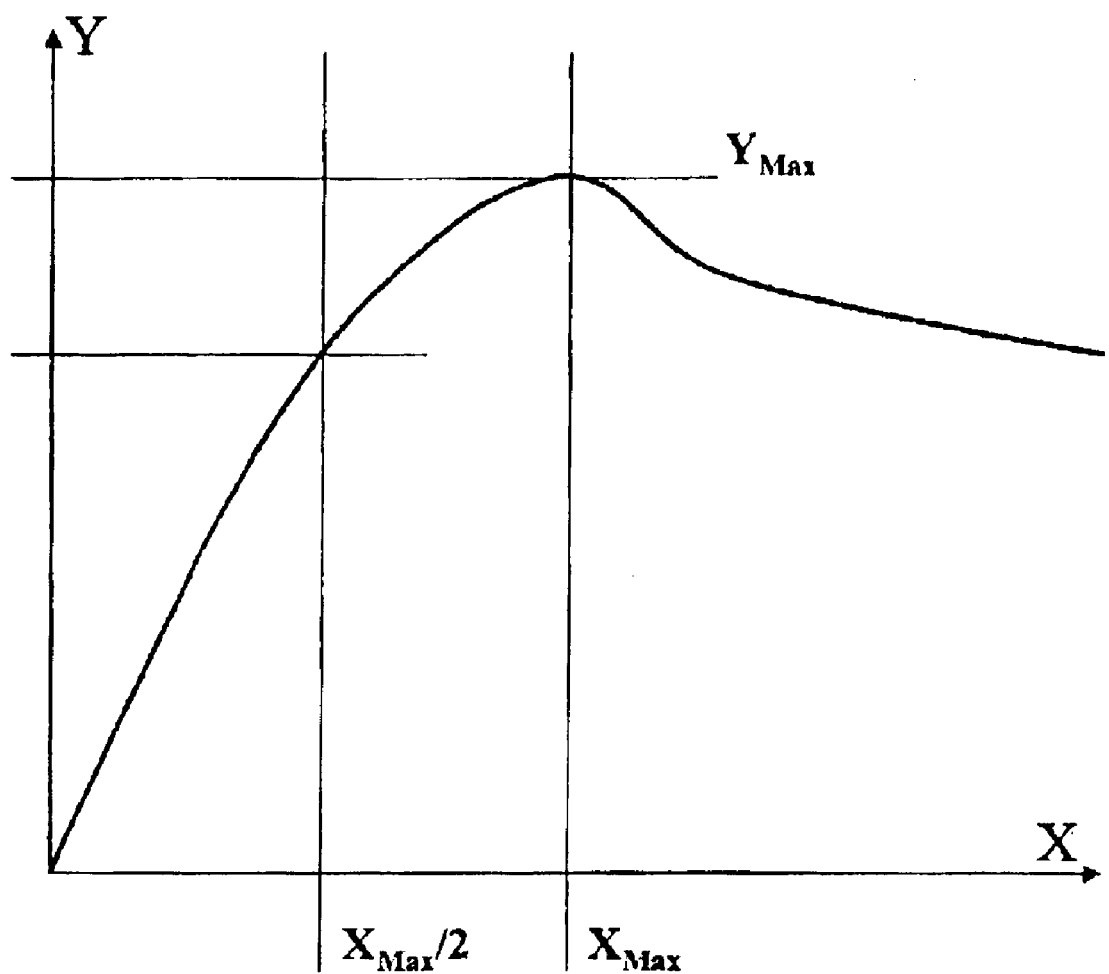
FIG. 10 shows a curve of general application to a phenomenon involving the variation of Y with respect to X, exhibiting a maximum of Y for a particular X, and a monotonic rise of the maximum of Y.

It is assumed that this slope varies linearly with G (which is a good approximation at least in the first part of the curve). It is therefore possible to calculate the equation of the straight line α(G) (assuming a linear variation, see FIG. 9):

$$\alpha = a \cdot G + b \qquad \text{Eq. (3)}$$

By virtue of this equation and the Invariant "Invt" described in the previous section, it is possible to write:

$$a \cdot G_{\max} + b = Invt \cdot \left( a \cdot \frac{G_{\max}}{2} + b \right) \qquad \text{Eq. (4)}$$

From this the $G_{max}$ is thus deduced, which is the target to be aimed at by a vehicle brake system controller, and is, according to the invention:

$$G_{\max} = -\frac{b}{a} \cdot \frac{1 - Invt}{1 - \frac{Invt}{2}} \qquad \text{Eq. (5)}$$

The principle enabling $G_{max}$ to be calculated (more exactly the effective slip when the tread functions at the coefficient of friction $\mu_{max}$) makes it possible to determine the value of the target G whatever the tire type is, whatever its degree of wear or ageing is, and whatever the tire use conditions are.

In addition, although the above Eq. (3) shows that a linear regression enables the evolution of the variation of the coefficient of friction μ as a function of the slip G to be modelled very correctly, it has been found that the precision of the proposed procedure is improved if a judicious choice is made of the most appropriate type of regression. Thus, the choice of the appropriate type of regression is included in the invention, which proposes in general a regulating procedure as explained below.

The above observations being based on curves representing the variation of the coefficient of friction μ with respect to the slip G, they remain valid for the lateral force $F_y$ as a function of the drift angle δ of the tire because this phenomenon has a very similar curve. The invention therefore applies to physical phenomenons possessing the following properties:

Let X be the slip G of a tire (one aspect of the invention) or the drift angle δ of the tire (the other aspect of the invention), X being measured or estimated; and Let Y respectively be the coefficient of friction $\mu$ of a tire (one aspect of the invention) or the lateral force $F_y$ of a tire (the other aspect of the invention), Y being measured or estimated.

The aim is to maximize the value of Y as quickly as possible, for a process Y(X) starting for low X's. A robust algorithm is proposed here which enables in particular the maximum to be obtained without knowledge a priori thereof and without the need to exceed it, in a context of actual measurement (or estimation) (generally affected by a noise at the input X and the output Y). The method does not require the absolute value of Y.

Use is made of the following observations, which are valid for the slip aspect as well as for the drift aspect:

An underlying relationship exists between the secant at the maximum (in $X_{max}$) and the secant in $X=X_{max}/2$. The typical relationship is a constant quotient (Invariant). This Invariant must be determined on each application of the method to a particular phenomenon.

A practical, non-limiting, method for determining the Invariant is as follows:

$$Invt = \frac{\frac{Y}{X}(X_{max})}{\frac{Y}{X}(p \cdot X_{max})} \quad \text{Eq. (6)}$$

where the value of p is always positive and less than 1. Advantageously, the value of p is between 0.25 and 0.75. The lower the value of p, the less precise is the method but the greater is the reactivity of the automatic control. Conversely, the greater the value of p, the greater is the precision, but the lower is the reactivity since the final acquisition is too close to the maximum. This is why a preferred value of p is 0.5.

It will always hold that: $0<Invt\leq 1$. The quantity "Invt", presented above as an intrinsic Invariant in the physical phenomenon under consideration, becomes in practice a degree of freedom which enables the algorithm to be finely adjusted by offering an adjustment variable in the refinement of a particular system, for any application to a particular field.

Typically, the following will be considered as first approximation:

$$Invt = \frac{\frac{Y}{X}(X_{max})}{\frac{Y}{X}\left(\frac{X_{max}}{2}\right)} \quad \text{Eq. (7)}$$

The variation of the secant as a function of X may be adjusted by a simple interpolation curve (typically linear or exponential, or even power). An adjustment can be carried out in real time. It is then possible to deduce therefrom the position of the maximum $X_{max}$ before it is (extrapolation).

Other types of regressions for the relationship of the secant as a function of X may be used, in which case it is advisable to solve the corresponding system (Eq. (7) is a linking of the value of the secant at the maximum to the half value) to obtain the analytical or approximation formula of the $X_{max}$. A scale error on Y (for example Y is systematically overestimated by 50%) change the predicted value of $X_{max}$, and this gives the scale effect a very advantageous low sensitivity.

The intention is to rely on Invariants of the physical curve to deduce the maximum by "measuring" as one goes along during the "rise" towards the maximum, by using all of the relevant information available.

Figure 1:
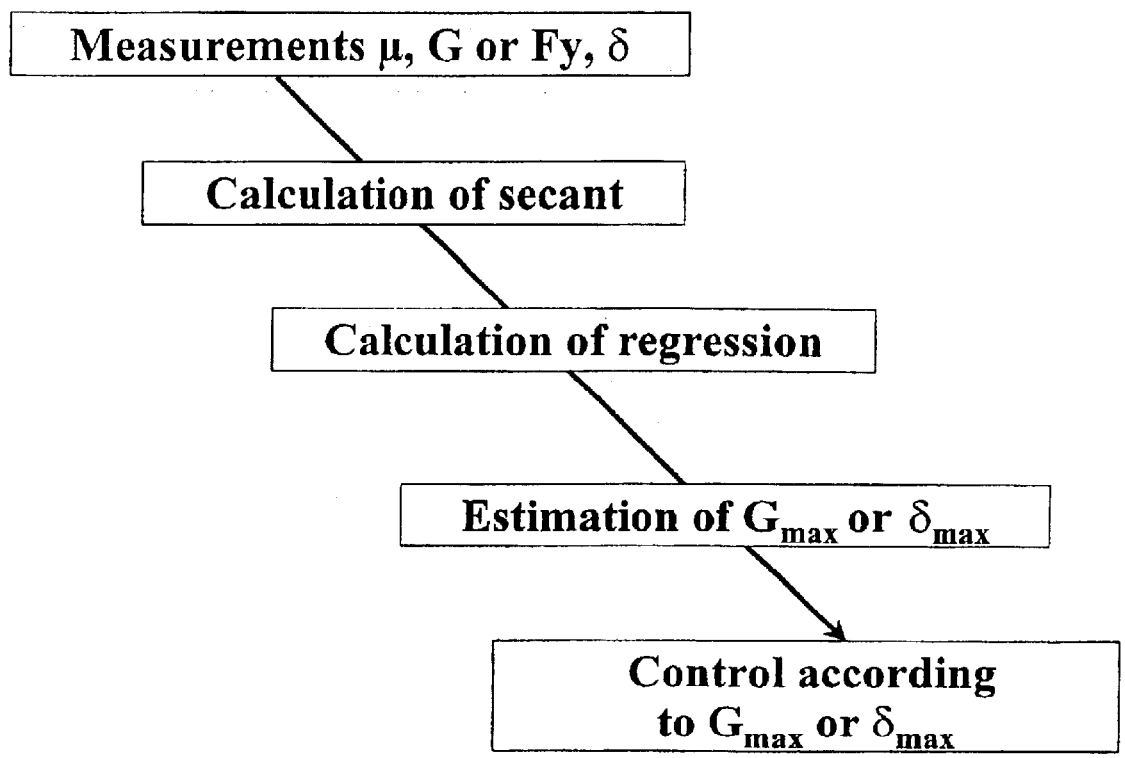
FIG. 1 is a block diagram showing the automatic control procedure according to the invention.
Figure 2:
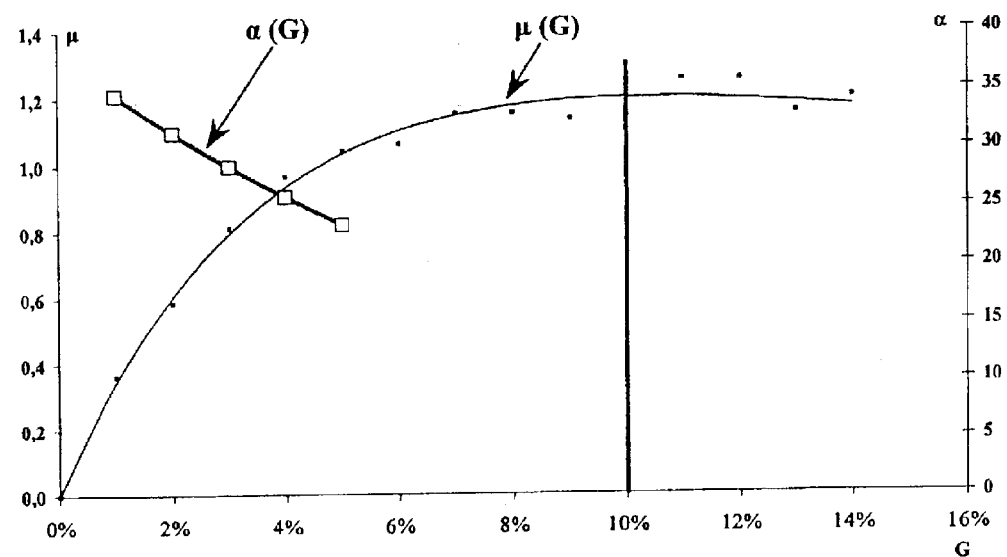
FIG. 2 is a curve of the variation of the coefficient of friction μ with respect to the slip G and the variation at the same slip of the secant α(G) passing through the origin and the point of the previous curve at the same slip.

FIG. 1 illustrates the proposed algorithm, the main steps of which are as follows:

1. Acquisition of the points $(X_i, Y_i)$, by measurement or estimation, according to the practical possibilities. It is advisable to acquire at least 2 points. It is ensured that $X_i$ is significantly non-zero, and a minimum threshold may be imposed here to eliminate values which are too low to be relevant.

2. Calculation of the secant $\alpha_i$; with the previous values the value of the secant is evaluated by direct calculation $\alpha_i = Y_i/X_i$, or by carrying out a suitable regression, for example linear:

$$\sum_{XX} = \sum X_j^2, \sum_{XY} = \sum X_j \cdot Y_j, \alpha_i = \frac{\sum_{XY}}{\sum_{XX}} \quad \text{Eq. (8)}$$

considering all the subscript points less than or equal to i so as to eliminate the noise. This is because the linear regression is by nature much less sensitive to the measurement noise on each individual point, the disturbances tending to "cancel each other out" if a sufficient number of points are considered (cf. basic statistical properties). This approach is particularly advantageous since, unlike in the past, it is not the individual values which are of interest (imprecise since noisy) but tendencies emerging from a plurality of values. The pairs $(\alpha_i, X_i)$ are therefore obtained.

3. Calculation of the regression with $(\alpha_i, X_i)$; a regression is calculated from a sufficient number "n" of points measured or estimated, typically 5 points, although this must be refined according to the physical phenomenon in question and according to the noise level).

Case of a linear regression:

$$A^{Lin} = \frac{n \cdot \sum X \cdot \alpha - \sum X \cdot \sum \alpha}{n \cdot \sum X^2 - (\sum X)^2}, \quad \text{Eq. (9)}$$

$$B^{Lin} = \frac{\sum \alpha \cdot \sum X^2 - \sum X \cdot \alpha \cdot \sum X}{n \cdot \sum X^2 - (\sum X)^2}$$

Case of an exponential regression:

$$A^{Exp} = \frac{n \cdot \sum X \cdot Ln(\alpha) - \sum X \cdot \sum Ln(\alpha)}{n \cdot \sum X^2 - (\sum X)^2}, \quad \text{Eq. (10)}$$

$$B^{Exp} = \frac{\sum Ln(\alpha) \cdot \sum X^2 - \sum X \cdot Ln(\alpha) \cdot \sum X}{n \cdot \sum X^2 - (\sum X)^2} \quad \text{Eq. (11)}$$

A and B are therefore obtained by the most suitable regression. Other regressions than the ones indicated might be used, the various regressions to be considered are well known to a person skilled in the art, who will be able to obtain the coefficients of the selected regression.

4. An estimation of $X_{max}$ is then calculated:

For the case of a linear regression, the following is obtained:

$$X_{max} = -\frac{B^{Lin}}{A^{Lin}} \cdot \frac{1 - Invt}{1 - p \cdot Invt}, \quad \text{Eq. (12)}$$

with $\alpha = A^{Lin} \cdot X + B^{Lin}$

For the case of an exponential regression, the following is obtained:

$$X_{\max} = \frac{Ln(Invt)}{p \cdot A^{Exp}}, \quad \text{Eq. (13)}$$

with $\alpha = e^{A^{Exp} \cdot X + B^{Exp}}$

5. When $X_{max}$ is known, according to the particular use of the method, the most appropriate parameter is acted upon. For example, the value of the parameter X is automatically controlled so as to maintain the value thereof at $X_{max}$.

6. It is also possible, although not always useful, to go as far as calculating an estimation of $Y_{max}$:

For the case of a linear regression, in addition $Y_{max}$ is determined as follows, where $Y^{coeff\_lin}$ is an experimentally adjusted coefficient:

$$Y_{\max} = Y^{\text{Coeff\_lin}} \cdot X_{\max} \cdot (A^{Lin} \cdot X_{\max} + B^{Lin}) \quad \text{Eq. (14)}$$

For the case of an exponential regression, in addition $Y_{max}$ is determined as follows, where $Y^{coeff\_exp}$ is an experimentally adjusted coefficient:

$$Y_{\max} = Y^{\text{Coeff\_exp}} \cdot X_{\max} \cdot e^{A^{Exp} \cdot X_{\max} + B^{Exp}} \quad \text{Eq. (15)}$$

Example of calculation of $Y_{max}$:

Linear: $Y_{\max} = \frac{X_{\max}}{0.75} \cdot (A^{Lin} \cdot X_{\max} + B^{Lin})$   See, Eq. (14)

Exponential: $Y_{\max} = \frac{X_{\max}}{1.19} \cdot e^{A^{Exp} \cdot X_{\max} + B^{Exp}}$   See, Eq. (15)

It may be useful to make a small correction to the predicted value of $Y_{max}$ since the curvature around the maximum does not correspond exactly to the type of function considered for the approximation of the secant. The coefficient of correction (1/0.75=$Y^{coeff\_lin}$ in the linear case, or 1/1.19=$Y^{coeff\_Exp}$ in the exponential case) is to be adjusted experimentally case by case, according to the application of the invention.

Some possible applications of the invention will now be examined in more detail, the rest of the description being neither limiting nor exhaustive.

EXAMPLE 1

Automatic Maintenance of the Functioning of a Tire Working on a Vehicle at a Certain Coefficient of Friction, for Example at the Maximum Coefficient of Friction $\mu_{max}$ Let us return to the application example concerning the longitudinal grip: $\mu(G)$. In this case, as already explained in the introductory section of this specification, Y is the coefficient of friction $\mu$ of the tire, that is to say, the quotient of the longitudinal force, for example driving force or braking force, divided by the applied vertical force, that is to say the load applied to the tire, and X is the rate of slip G of the tire (G=0% when there is no slip between the speed of the tire and the speed of the vehicle, that is to say if the tire rolls freely, and G=100% if the tire is rotationally locked). Typically, depending on the environment (nature of the ground (asphalt, concrete), dry or wet (water level), temperature and level of wear of the tire), the value of $\mu$ as a function of the slip G may vary enormously ($\mu$ is about 0.15 on ice and about 1.2 on a dry ground). Reference may be made to FIG. 4 showing several curves of $\mu$ as a function of the slip G for a new XH1 195/65R15 measured in a load and speed condition.

Figure 11:
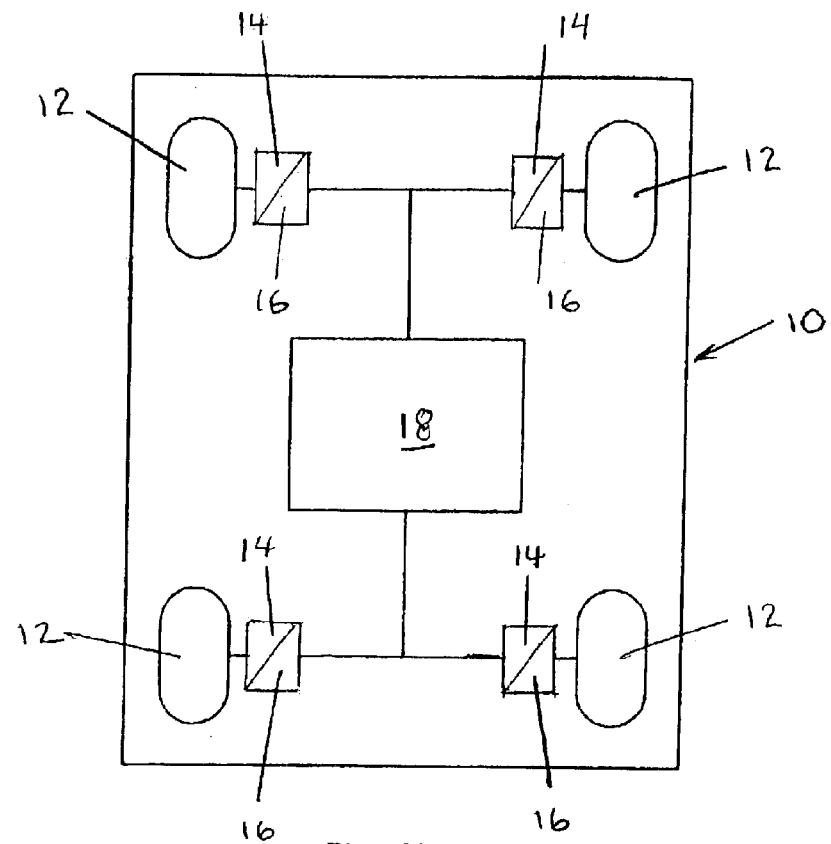
FIG. 11 is a diagrammatic representation of a passenger vehicle having a system for controlling the stability of the vehicle, which system includes a controller linked with sensors and/or actuators for each of the wheels.

A system in accordance with the invention is diagrammatically illustrated in FIG. 11. As there shown, a passenger vehicle 10 includes four tires 12 and, operatively associated with each tire 12, an actuator(s) 14 for imparting a force to the tire and/or a sensor(s) 16 for detecting/measuring parameters of interest. The system also includes a programmed controller 18 for performing the operations herein described and for acquiring data from and/or transmitting commands to the actuator(s) 14 and/or the sensor(s) 16. The implementation of the actuator(s), the sensor(s), and the controller in accordance with the present invention is within the capability of the man of ordinary skill in the art.

The proposed system enables in particular automatic control of the slip G so as to maintain it at predetermined optimum value $G^{Opt}$. The predetermined slip $G^{Opt}$ is chosen, more particularly and in a non-limiting manner, such that the predetermined value of the coefficient of friction corresponds substantially to the value $\mu_{max}$. In this case, it is customary to name this particular optimum value $G_{max}$.

It is found that the position of the maximum for this tire varies depending on the ground. In addition, sometimes there is no unity. For the same maximum level attained, it is possible to have two corresponding slips. Nevertheless, there exists an Invariant "Invt" shared by these curves.

By applying the equation for determining the Invariant to the case of the analysis of the coefficient of friction as a function of the slip, the Invariant is calculated in particular as follows:

$$Invt = \frac{\frac{\mu}{G}(G_{\max})}{\frac{\mu}{G}(p \cdot G_{\max})}, \quad \text{See, Eq. (6)}$$

with p having a positive value less than 1.

As far as p is concerned, just as explained above, its value is preferably between 0.25 and 0.75, for example it is 0.5, the reader being referred to the general presentation above as regards the consequences of the choice of the value of p.

The following is thus obtained:

$$\frac{\frac{\mu}{G}(G = G_{\max})}{\frac{\mu}{G}(G = G_{\max}/2)} \approx 0.58 \quad \text{See, Eq. (1)}$$

An Invariant "Invt" has been introduced by processing the data at a first value of a parameter X, for example the slip G, corresponding to the maximum of another parameter Y, for example the coefficient of friction $\mu_{max}$, and at a second value corresponding to 50% of the first value, for example 50% of the aforementioned slip. It has been seen that the choice of processing at 50% is arbitrary and that, if processing is performed at 25% or at 75% of the slip corresponding to the coefficient of friction $\mu_{max}$, an Invariant may also be obtained. This choice is therefore part of the experimental phase particular to each specific application.

It is then advisable to determine the slope $\alpha_i$. This is done by direct calculation $\alpha_i = \mu_i/G_i$ or a suitable regression is used, for example a linear regression as follows:

$$\sum_{GG} = \sum G_j^2, \sum_{G\mu} = \sum G_j \cdot \mu_j, \alpha_i = \frac{\sum G\mu}{\sum GG} \qquad \text{See, Eq. (8)}$$

Or two particular coefficients $A_p$, A and B, are calculated by the following linear regression, applied to "n" measured or estimated points:

$$A^{Lin} = \frac{n \cdot \sum G \cdot \alpha - \sum G \cdot \sum \alpha}{n \cdot \sum G^2 - (\sum G)^2}, \qquad \text{See, Eq. (9)}$$

$$B^{Lin} = \frac{\sum \alpha \cdot \sum G^2 - \sum G \cdot \alpha \cdot \sum G}{n \cdot \sum G^2 - (\sum G)^2}$$

Next, where a linear regression is being used, $G^{Opt}$ is calculated as follows:

$$G^{Opt} = -\frac{B^{Lin}}{A^{Lin}} \cdot \frac{1 - Invt}{1 - p \cdot Invt}, \qquad \text{See, Eq. (12)}$$

with $\alpha = A^{Lin} \cdot G + B^{Lin}$

If necessary, it is possible to carry on as far as the determination of the value of $\mu$ corresponding to $G^{Opt}$, as follows, where $\mu^{coeff\_lin}$ is an experimentally adjusted coefficient:

$$\mu = \mu^{Coeff\_lin} \cdot G^{Opt} \cdot (A^{Lin} \cdot G^{Opt} + B^{Lin}) \qquad \text{See, Eq. (14)}$$

The following table, determined with a linear approach for the secant, illustrates the calculation of the maximum slip from actual measurements on the same MICHELIN XH1 195/65-15 tire tested on various grounds at an inflation pressure of 2 bars:

Or else, two particular coefficients $A_p$, A and B, are calculated by the following exponential regression:

$$A^{Exp} = \frac{n \cdot \sum G \cdot Ln(\alpha) - \sum G \cdot \sum Ln(\alpha)}{n \cdot \sum G^2 - (\sum G)^2}, \qquad \text{See, Eq. (10)}$$

$$B^{Exp} = \frac{\sum Ln(\alpha) \cdot \sum G^2 - \sum G \cdot Ln(\alpha) \cdot \sum G}{n \cdot \sum G^2 - (\sum G)^2} \qquad \text{See, Eq. (11)}$$

Next, where an exponential regression is being used, $G^{Opt}$ is calculated as follows:

$$G^{Opt} = \frac{Ln(Invt)}{p \cdot A^{Exp}}, \text{ with } \alpha = e^{A^{Exp} \cdot G + B^{Exp}} \qquad \text{See, Eq. (13)}$$

If necessary, it is possible to carry on as far as the determination of $\mu_{max}$, as follows, where $\mu^{coeff\_exp}$ is an experimentally adjusted coefficient:

$$\mu_{max} = \mu^{Coeff\_exp} \cdot G^{Opt} \cdot e^{A^{Exp} \cdot G^{Opt} + B^{Exp}} \qquad \text{See, Eq. (15)}$$

This principle may be applied to determine the maximum grip for any type of tire and for any type of ground, which proves to be very advantageous for the reliability of trajectory control systems.

The proposed method is self-adaptive and very robust since only the variation of the coefficient of friction is dealt with and not its absolute value. It has been found that the sensitivity to noise is very low.

The intrinsic nature of the above method applied to the longitudinal grip of a tire as a function of its slip means that it is very particularly suited to the modelling of the grip of a tire in a vehicle brake system.

It is known that while a vehicle brake system is efficient, it is however optimized for a limited number of tires, chosen by the manufacturer, and that it does not adapt to the tires actually fitted on the vehicle. In particular, it does not adapt to winter tires, which, as is known, moreover, behave radically differently, in particular the grip and the slip at force $F_x$ on the given ground. Consequently, the efficiency of a vehicle brake system can be improved if it can automatically adapt to the tires actually used on the vehicle.

Of course, in the case of a vehicle with an internal combustion engine of a design which is common at present, the means for imparting a slip to the tire are essentially the brakes in a braking situation and are essentially the engine management system under a driving force. A person skilled

| # Ground | 1 | 2 | 3 | 4 | 5 | 6 | 7 | 8 | 9 | 10 | 11 | 12 |
|---|---|---|---|---|---|---|---|---|---|---|---|---|
| Actual $G^{max}$ | 10% | 11% | 11% | 13% | 13% | 13% | 12% | 13% | 9% | 9% | 15% | 15% |
| Actual $\mu^{max}$ | 0.41 | 0.78 | 0.79 | 1.06 | 1.05 | 0.75 | 0.72 | 0.48 | 0.49 | 0.48 | 1.17 | 1.13 |
| Measured $A^{Lin}$ | −64 | −109 | −105 | −108 | −110 | −76 | −77 | −60 | −81 | −127 | −97 | −88 |
| Measured $B^{Lin}$ | 11 | 19 | 18 | 22 | 22 | 15 | 15 | 11 | 13 | 16 | 22 | 20 |
| Predicted $G_{max}$ | 10% | 11% | 11% | 12% | 12% | 13% | 12% | 12% | 10% | 8% | 14% | 14% |
| Predicted $\mu_{max}$ | 0.41 | 0.75 | 0.76 | 1.03 | 1.03 | 0.73 | 0.71 | 0.48 | 0.48 | 0.48 | 1.16 | 1.12 | in the art will have no difficulty in adapting the present invention to other vehicle designs, for example electric vehicles.

Of course, the invention as described hereabove does not preclude that the controller of the system is loaded by, in addition to the means described here, other programs embodying other slip control strategies, which may be more desirable in certain circumstances, e.g. in view of estimated or measured values of $(G_i, \mu_i)$ upon any particular activation of means to impart a slip to the tire.

In particular, a good approach for determining the Invariant is as follows:

$$Invt = \frac{\frac{\mu}{G}(G_{max})}{\frac{\mu}{G}(p \cdot G_{max})}, \quad \text{See, Eq. (6)}$$

more particularly again with p having a value between 0.25 and 0.75, typically 0.5.

Figure 12:
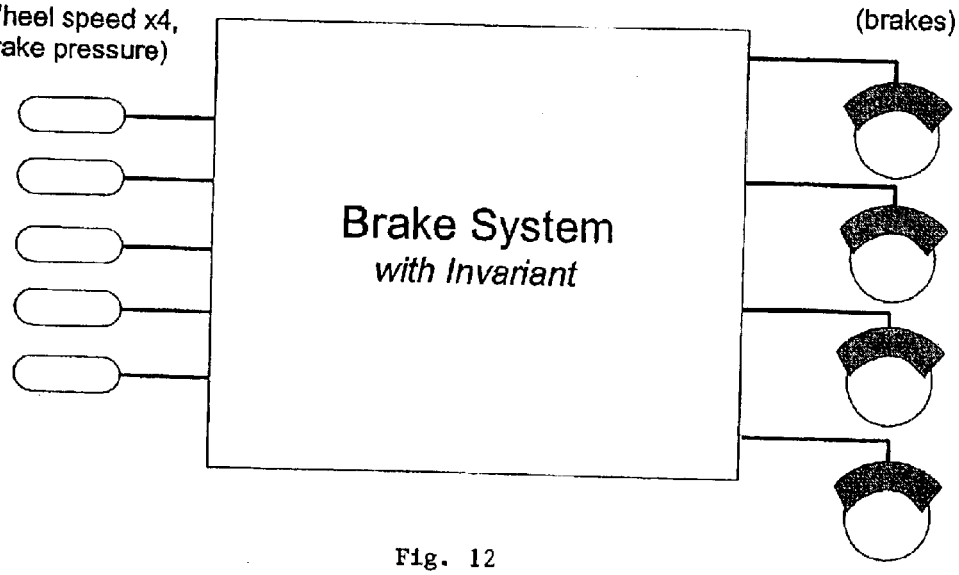
FIG. 12 illustrates the operation of a system designed to control the longitudinal force generated by the tires.

In a particular embodiment of the invention, the device for modulating the slip acts on the brake control. In another embodiment of the invention, the device for modulating the slip acts on the driving torque at the wheels. Such a system is illustrated diagrammatically in FIG. 12.

It is proposed to create a new algorithm, particularly useful for a vehicle brake system, which enables the position of the coefficient of friction $\mu_{max}$ to be determined on the basis of the Invariant "Invt" presented above. As a reminder, such a system carries out an estimation of the coefficient of friction $\mu_{max}$, then chooses an optimum slip by virtue of a reference curve. It is proposed to replace these steps by what follows.

The implementation of this principle requires a few modifications in an ABS controller:

It is preferable for the calculation frequency to be above 40 Hz.

It is advisable preferably to regulate the triggering of the ABS so as to have the time to acquire a sufficiently large number of points for the calculation of the target to be reliable (representative).

It proves to be advantageous to eliminate the measurement points at a slip which is too low (corresponding for example to a slip less than 1%).

In order to obtain a very good accuracy on the slip G, it is advantageous to acquire the speed of the vehicle with a specific means and not through wheel speed data processing (GPS, ground observation, . . . )

With the new algorithm proposed above, the efficiency of the vehicle brake system will be very good over the entire range of tires usable realistically on a vehicle.

The new algorithm developed enables the system to adapt to any type of tire automatically without requiring, a priori, any additional sensor and any measurement in the tread of a tire. Moreover, this algorithm obviates the need for a fine adjustment for a type of tire chosen for a given vehicle.

As specified above, the method makes it possible to obtain results not only with measured values but also with estimated values. Information on the actual (and not estimated) forces Fx, Fy and Fz could make it possible to have a more precise target and/or to do plausibility checks and thus to improve the reliability of the vehicle brake system.

EXAMPLE 2

Analysis of the Functioning of a Tire Working on a Vehicle, the Tire Being under Drift Conditions, and Analysis of Lateral Force $F_y$ Developed (also Called Drift Thrust)

Another application is explained below. It involves characterizing the lateral force $F_y$ as a function of the drift angle $\delta$ of the tire (the drift angle $\delta$ is the angle between the projection on the ground of the plane of the wheel and the vector velocity of the vehicle on the ground). An optimum drift angle $\delta^{Opt}$, for instance the drift angle at which the tire develops the maximum lateral force $F_y$ may be predetermined, and the lateral force $F_{ymax}$ may be predetermined. The maximum lateral force is critical for example for the equilibrium of a vehicle on cornering.

The relationship between the lateral force $F_y$ and the drift $\delta$ is of the same type as for $\mu$ and G in the previous section.

Consequently, it is possible for example to determine the Invariant as follows:

$$Invt = \frac{\frac{F}{\delta}(\delta^{Opt})}{\frac{F}{\delta}(p \cdot \delta^{Opt})}. \quad \text{See, Eq. (6)}$$

As far as p is concerned, just as explained above, its value is preferably between 0.25 and 0.75, for example it is 0.5. The reader is referred to the general presentation above as regards the consequences of the choice of the value of p. In this precise case, the magnitude "Invt" is notably higher; 0.8 has been obtained while retaining a minimum drift-angle threshold of 2°, in order to avoid values of too low a drift which interferes with the determination of the secant.

Figure 3:
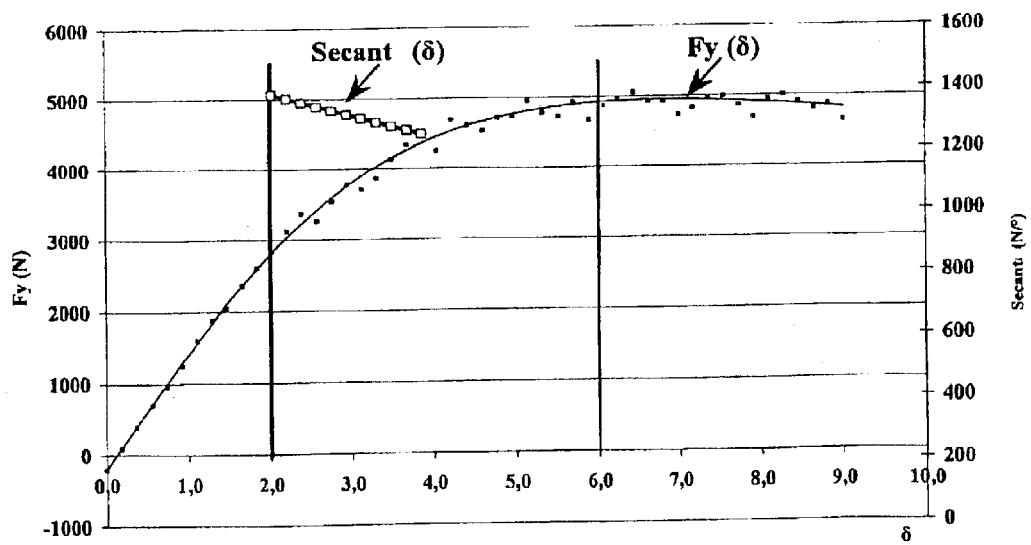
FIG. 3 is a curve of the variation of the drift thrust $F_y(N)$ with respect to the drift angle δ and the variation at the same drift angle of the secant passing through the origin and the point of the previous curve at the same drift angle.

FIG. 3 is a curve of the variation of the drift thrust $F_y$ with respect to the drift angle $\delta$ and the variation at the same drift angle of the secant passing through the origin and the point of the previous curve at the same drift angle. For a Michelin Primacy 235/55R17 tire loaded at 5000 newton, without camber, the maximum drift angle estimated by the method is 5.5°, and the maximum estimated drift thrust is 5935 newton.

It is advisable next to determine the slope $\alpha_i$. This is done by direct calculation $\alpha_i = F_i/\delta$ or a suitable regression is used, for example a linear regression as follows:

$$\sum_{\delta\delta} = \Sigma \delta_j^2, \sum_{\delta F} = \Sigma \delta_j \cdot F_j, \alpha_i = \frac{\sum_{\delta F}}{\sum_{\delta\delta}} \quad \text{See, Eq. (8)}$$

Or two particular coefficients $A_p$, A and B, are calculated by the following linear regression, applied at "n" measured or estimated points:

$$A^{Lin} = \frac{n \cdot \Sigma \delta \cdot \alpha - \Sigma \delta \cdot \Sigma \alpha}{n \cdot \Sigma \delta^2 - (\Sigma \delta)^2}, B^{Lin} = \frac{\Sigma \alpha \cdot \Sigma \delta^2 - \Sigma \delta \cdot \alpha \cdot \Sigma \delta}{n \cdot \Sigma \delta^2 - (\Sigma \delta)^2} \quad \text{See, Eq. (9)}$$

Next, where a linear regression is being used, $\delta^{Opt}$ is calculated as follows:

$$\delta^{Opt} = \frac{B^{Lin}}{A^{Lin}} \cdot \frac{1 - Invt}{1 - p \cdot Invt}, \quad \text{See, Eq. (12)}$$

with $\alpha = A^{Lin} \cdot \delta + B^{Lin}$

By applying the algorithm, it is predetermined that the lateral force ($F_y$) will attain its maximum at a drift angle $\delta$ of about 6°. This information is valuable since it is then known that the tire no longer has much potential for transverse thrust before it starts to slip (saturation of the transverse thrusts, which may prevent a vehicle from turning).

If necessary, it is possible to carry on as far as the determination of the value of F corresponding to $\delta^{Opt}$, as follows, where $F^{coeff\_lin}$ is an experimentally adjusted coefficient:

$$F_{max} = F^{Coeff\_lin} \cdot \delta^{Opt} \cdot (A^{Lin} \cdot \delta^{Opt} + B^{Lin}) \quad \text{See, Eq. (14)}$$

Or else, two particular coefficients $A_p$, the coefficients A and B, are calculated by the following exponential regression, applied at "n" measured or estimated points:

$$A^{Exp} = \frac{n \cdot \Sigma\delta \cdot Ln(\alpha) - \Sigma\delta \cdot \Sigma Ln(\alpha)}{n \cdot \Sigma\delta^2 - (\Sigma\delta)^2}, \quad \text{See, Eq. (10)}$$

$$B^{Exp} = \frac{\Sigma Ln(\alpha) \cdot \Sigma\delta^2 - \Sigma\delta \cdot Ln(\alpha) \cdot \Sigma\delta}{n \cdot \Sigma\delta^2 - (\Sigma\delta)^2} \quad \text{See, Eq. (11)}$$

Next, where an exponential regression is being used, $\delta^{Opt}$ is calculated as follows:

$$\delta^{Opt} = \frac{Ln(Invt)}{p \cdot A^{Exp}}, \text{ with } \alpha = e^{A^{Exp}\delta + B^{Exp}} \quad \text{See, Eq. (13)}$$

If necessary, it is possible to carry on as far as the determination of $F_{target}$ as follows, where $F^{coeff\_exp}$ is an experimentally adjusted coefficient:

$$F_{max} = F^{Coeff\_exp} \cdot \delta^{Opt} \cdot e^{A^{Exp} \cdot \delta^{Opt} + B^{Exp}} \quad \text{See, Eq. (15)}$$

According to this aspect, the invention proposes a method for controlling the functioning of a tire proposed by the invention, including a phase for predicting the value of the drift angle δ of a tire where the lateral force is maximal, and setting a warning signal if the drift angle is such that the ability to develop drift thrust is saturated, enabling a warning to be given to the driver if too close an approach is made to the maximum potential of the tire in terms of drift thrust, or, in a more advanced version integrated in a system for automatically controlling the stability of a vehicle, in the event of the occurrence of the warning signal, the vehicle speed is limited or reduced automatically, or any other appropriate correction step is taken.

Figure 13:
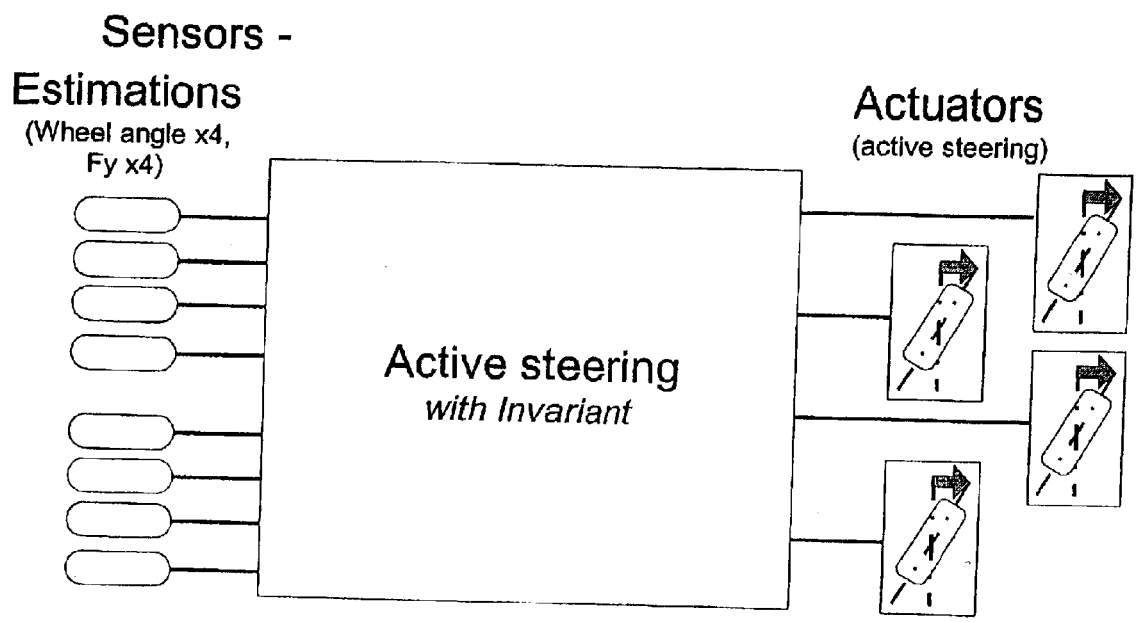
FIG. 13 illustrates the operation of a system designed to control the lateral force generated by the tires.

The invention may also be applied to an active vehicle (having active steering on the rear and/or the front axle, or an active control of the body roll or any system acting on the lateral equilibrium of the vehicle, thus acting on the lateral thrust imposed on the tires), that is to say capable of reacting also according to commands coming from a system for automatically controlling the lateral stability of a vehicle. Such a system is illustrated diagrammatically in FIG. 13.

In this regard, the invention thus extends to a system for controlling the stability of a vehicle having at least one tire intended to roll on the ground, the vehicle being equipped with a system for controlling a selected parameter (hereunder called parameter <<λ>>), depending on the technology used on the vehicle (for instance the parameter <<λ>> is the steering of the rear and front wheels for an active steering, or the parameter <<λ>> is the body roll for an active anti-roll, or the parameter <<λ>> is the braking force for a stability control through braking actuators . . . ), depending on the commands imparted by the vehicle driver to his control means, and depending on the commands delivered by a path controller aimed at maintaining the functioning of the tire at a predetermined target value of the drift thrust $F_{target}$, that is to say, having a direct or indirect consequence on the drift angle of the tires in each axle, the path controller using at least one optimum value $\delta^{Opt}$ of the drift angle corresponding to the maximum value of the drift thrust $F_{target}$, the controller including means for performing the following operations (operating on each axle—the share not being the same in the front and in the rear axle—and distinguishing the left and right tires, are desirable, but the principle is exposed hereunder for only one tire, the skilled person being able to process for all the tires):

On each activation of the parameter <<λ>> control, for at least two different levels "i" of the tire drift angle, recording various values of $F_{Yi}$, and the associated drift angle $\delta_i$;

Determining the slope $\alpha_i$ of the straight line passing through the origin and through $(\delta_i, F_{Yi})$;

Calculating coefficients $A_p$ by direct calculation or by an appropriate regression, in particular a regression chosen from the group consisting of a linear regression and an exponential regression, from a sufficient number of pairs with $(\alpha_i, \delta_i)$ so as to model a variation curve $\alpha_i = f(\delta_i, A_p)$;

Calculating the optimum value $\delta^{Opt}$ of the tire drift angle associated with the maximum value of the drift thrust $F_{target}$ by using a predetermined Invariant "Invt"; and Producing a warning signal when the drift angle δ is close to $\delta^{Opt}$.

As already explained above, the optimum drift angle value $\delta^{Opt}$ is calculated by the modelling formula (above-mentioned variation curve) resulting from the choice of direct calculation or regression. In particular, a good approach for determining the Invariant is as follows:

$$Invt = \frac{\frac{F}{\delta}(\delta^{Opt})}{\frac{F}{\delta}(p \cdot \delta^{Opt})}, \quad \text{See, Eq. (15)}$$

more particularly again with p having a value which is between 0.25 and 0.75, typically 0.5.

In a particular embodiment of this aspect of the invention, in the event of the occurrence of a warning signal, the system for controlling a selected parameter is acted upon so as to maintain the drift angle δ at the optimum value $\delta^{Opt}$. In another embodiment of this aspect, in the event of the occurrence of a warning signal, the vehicle speed is limited or reduced.

It should be emphasized, and this is important, that the aspects concerning the utilization of the coefficient of friction as a function of the slip, and the utilization of the drift thrust as a function of the drift angle, are not mutually exclusive, quite the contrary. Notably, it is advantageous for a system for automatically controlling the path of a vehicle to utilize these two aspects simultaneously.

The first so-called "ABS" brake systems automatically modulated the brake force (actually, the braking actuator generally being now a hydraulic jack, an ABS system modulates the hydraulic pressure) so as to cause the functioning of the tire to oscillate about the maximum grip. This involves exceeding the maximum grip in order to be able to detect it by initiating the locking of the wheel (sudden deceleration of the rotation of the wheel), before reducing the brake force so as to be just below the maximum grip again. The brake force is then automatically increased again until it exceeds the maximum grip, then reduced, and so on.

Nevertheless, this method involves briefly exceeding the slip $G_{max}$ corresponding to the maximum value of the coefficient of friction $\mu_{max}$, whereas the ideal situation would be to approach the target slip by default without ever exceeding it. It is important to note that one calls $G_{max}$, conventionally, not a maximum possible value of the slip, but actually the particular slip at which the friction coefficient has its maximum possible value.

The efficiency of the braking depends on the fineness of the slip variations about the slip corresponding to the maximum coefficient of friction. When efficiency is referred to, the only concern here is the amount of the deceleration, putting aside the major benefit of ABS systems of affording the driver of the vehicle a certain capability to cause the latter to turn during emergency braking. Consequently, in the context of the present invention, braking is considered as being all the more efficient, the shorter the braking distance. The efficiency of such braking is impaired by the periods in which the braking is not at the level of the coefficient of maximum grip, that is to say during periods of excessive slip and during periods of insufficient slip.

The first so-called "ABS" brake systems, the functioning of which has been mentioned above, had the advantage of automatically adapting to the various tires. This feature is important since it is known for example that the slip of a winter tire at the maximum coefficient of friction is considerably greater than the slip of a summer tire at the maximum coefficient of friction, just as it is known that the slip of a new tire at the maximum coefficient of friction is greater than the slip of a worn tire at the maximum coefficient of friction. Unfortunately, the vibrations caused by this type of automatic control are unpleasant and may even have the effect that the driver releases the pressure on the brake pedal. This generation of brake system is illustrated for example by U.S. Pat. No. 3,980,346, in which an improvement of such a system is described.

This system enables adaptation to various tires. To do this, the pressure is increased in stages. The development of the rotational speed of the wheel is then observed, from which it is then reduced if the pressure needs to be increased or decreased; this automatic control is "adaptive" but naturally generates vibrations.

At present, vehicle stability control systems automatically modulate the brake force so as to aim at a predetermined target slip, which is supposed to correspond to the maximum coefficient of friction.

In this case, a vehicle brake system therefore aims to maintain a brake force such that the tread functions at the optimum level of slip chosen. Such a system continuously measures the rotational speed of each of the wheels $V_{Tire}$. With a specific algorithm (see for example U.S. Pat. No. 5,402,345), an estimation of the vehicle speed $V_{Vehicle}$ is obtained. An estimation of the instantaneous slip $G=1-V_{Tire}/V_{Vehicle}$ is therefore available. Ideally, as long as this estimated slip remains below the optimum slip, the brake force does not have to be lowered, or may even be automatically increased if a function for automatic brake boosting is activated (see for U.S. Pat. No. 5,816,666). When the greatest possible brake force is attained, the brake is regulated so as to maintain an optimum slip $G_{max}$, that is to say the slip corresponding to the maximum coefficient of friction ($\mu_{max}$).

All that remains is to determine the optimum slip. In EP patent application No. 0503025 this is done from a reference curve giving a value of G to be aimed for as a function of the estimated coefficient of friction p and the likewise estimated vehicle speed. An estimation of the coefficient of friction $\mu$ is carried out as follows. When braking in a straight line on a homogeneous ground, the brake force $F_X$ of the tire on the ground is determined from the brake pressure and the construction parameters of the wheel and of its brake. With the knowledge of all the forces $F_X$ applied by all the tires, it is possible to calculate the deceleration of the vehicle, and therefore, taking account of the vehicle characteristics, the load transfer, and therefore the load variations on each of the wheels. From this, it is possible to deduce an approximation of the vertical load $F_Z$ applied to each tire. An estimation of the coefficient of friction $$\mu = \frac{F_X}{F_Z}$$

is thus obtained. If the corresponding lateral force $F_y$ is known, by estimation or measurement, a more precise estimation of the coefficient of friction is given by the formula $$\mu = \frac{\sqrt{F_X^2 + F_Y^2}}{F_Z}.$$

In the context of the present invention, these two estimations will be considered as equivalent. Similarly, and this is obvious to a person skilled in the art, in the context of the present invention, everything that has been stated about braking is valid in the case of acceleration; in other words, a braking force is, as regards the considerations relating to grip, equivalent to a driving force, even if of course the actuators for modifying these are not the same.

Furthermore, by referring to the aforementioned reference curve, it is established what the reference coefficient $\mu$ for the estimated slip G would be. As long as the current estimated slip is below the target slip, the slip is increased until the slip values substantially coincide. An advantage of this second system is having fewer oscillations about the maximum slip than with the first.

Unfortunately, this reference curve is predetermined experimentally, and therefore for a limited number of tires, and is unable to take account of the actual state of the vehicle tire equipment, beyond these conditions of use, for example inflation pressure, level of wear, etc. Although this automatic control principle actually enables the vibrations to be limited or eliminated, the braking efficiency is all the more impaired since the tire actually used intrinsically requires a slip at the maximum coefficient of friction which is very different from that programmed in fact in the reference curve.

What is claimed is:

1. A system for controlling the stability of a vehicle having wheels, including means for imparting a longitudinal force to a tire intended to roll on the ground, means for modulating the longitudinal force, and comprising a controller using at least a slip parameter $G^{Opt}$ corresponding to a predetermined value of a coefficient of friction $\mu$, the system including means for performing the following operations:

(a) on each activation of the means for imparting a longitudinal force to the tire, for at least two different levels "i" of the longitudinal force each corresponding to one slip $G_i$, on condition that there is no loss of grip, determining values of the coefficient of friction $\mu_i$;

(b) determining a slope $\alpha_i$ of a straight line passing through the origin and through $(CT_i, \mu_i)$;

(c) calculating coefficients $A_p$ by direct calculation or by a regression from a selected number of pairs with ($\alpha_i$, $G_i$) so as to model a variation curve $\alpha_i = f(G_i, A_p)$;

(d) calculating the optimum slip $G^{Opt}$ by using a predetermined Invariant "Invt"; and (e) acting on the means for imparting a longitudinal force to the tire so as to maintain the slip at optimum value $G^{Opt}$.

2. A system for controlling the stability of a vehicle according to claim 1, in which the Invariant is determined as follows:

$$Invt = \frac{\frac{\mu}{G}(G_{max})}{\frac{\mu}{G}(p \cdot G_{max})},$$

with p having a positive value less than 1.

3. A system for controlling the stability of a vehicle according to claim 1, in which the means for modulating the longitudinal force acts on a brake control.

4. A system for controlling the stability of a vehicle according to claim 1, in which the means for modulating the longitudinal force acts on a driving torque at the wheels.

5. A system for controlling the stability of a vehicle having wheels and at least one tire intended to roll on the ground, the vehicle being equipped with a system for controlling a selected parameter λ depending on commands imparted by a vehicle driver to a control means and depending on commands delivered by a path controller aimed at maintaining functioning of the tire at a predetermined target value of drift thrust $F_{target}$, the path controller using at least one optimum value $\delta^{Opt}$ of drift angle corresponding to a maximum value of the drift thrust $F_{target}$, the system for controlling the stability of a vehicle including means for performing the following operations:

(a) on each activation of the system controlling said parameter λ for at least two different levels "i" of drift angle δ, recording various values of $F_{Yi}$, and the estimated or measured drift angle $\delta_i$;
  (b) determining a slope $\alpha_i$ of a straight line passing through an origin and through $(\delta_i, F_{Yi})$;
  (c) calculating coefficients $A_p$ by direct calculation or by a regression from a selected number of pairs with $(\alpha_i, \delta_i)$ so as to model a variation curve $\alpha_i = f(\delta_i, A_p)$;
  (d) calculating the optimum drift angle value $\delta^{Opt}$ associated with the maximum value of the drift thrust $F_{target}$ by using a predetermined Invariant "Invt"; and
  (e) producing a warning signal when the drift angle δ is close to $\delta^{Opt}$.

6. A system for controlling the stability of a vehicle according to claim 5, in which the Invariant is determined as follows:

$$Invt = \frac{\frac{F}{\delta}(\delta^{Opt})}{\frac{F}{\delta}(p \cdot \delta^{Opt})},$$

with p having a positive value less than 1.

7. A system for controlling the stability of a vehicle according to claim 5, in which the parameter λ relates to steering of the wheels and, in the event of the occurrence of the warning signal, the system for controlling the parameter λ is acted upon so as to maintain the drift angle δ at the optimum value $\delta^{Opt}$.

8. A system for controlling the stability of a vehicle according to claim 5, in which, in the event of the occurrence of the warning signal, a speed of the vehicle is limited or reduced.

9. A system for controlling the stability of a vehicle according to claim 1 or 5, in which two particular coefficients $A_p$, the coefficients A and B, are calculated by a regression chosen from the group consisting of a linear regression and an exponential regression.

10. A system for controlling the stability of a vehicle according to claim 2 or 6, in which the value of p is between 0.25 and 0.75.

11. A system for controlling the stability of a vehicle according to claim 10, in which p is 0.5.

12. A system for controlling the stability of a vehicle having wheels and at least one tire intended to roll on the ground and capable of functioning when subject to drift, including means for predicting a value of a drift angle δ of the tire where a lateral force is maximal, the means for predicting comprising means for performing the following operations:

(a) determining estimations $(\delta i, F_i)$ for at least one pair "i" of values;
  (b) determining the corresponding values of a slope $\alpha_i$ of a straight line passing through an origin and through $(\delta_i, F_i)$;
  (c) calculating coefficients $A_p$ by direct calculation or by a regression from a selected number of pairs with $(\alpha_i, \delta_i)$ so as to model a variation curve $\alpha_i = f(\delta_i, A_p)$;
  (d) calculating a value of drift angle $\delta^{Opt}$ by using a predetermined Invariant "Invt";
  (e) producing a warning signal when the drift angle δ is close to $\delta^{Opt}$; and
  (f) in the event of the occurrence of the warning signal, limiting or reducing automatically the vehicle speed.

13. A system for controlling the stability of a vehicle according to any one of claims 1, 5 and 12, in which the means for performing operation (d) includes means for using the Invariant "Invt" as an adjustment variable.

14. A system for controlling the stability of a vehicle according to claim 2, in which the value of "Invt" is about 0.58.

15. A system for controlling the stability of a vehicle according to claim 1, in which the slope $\alpha_i$ is determined by direct calculation according to: $\alpha_i = \mu_i / G_i$.

16. A system for controlling the stability of a vehicle according to claim 1, in which the slope $\alpha_i$ is determined by carrying out a regression.

17. A system for controlling the stability of a vehicle according to claim 1, in which a linear regression is carried out according to:

$$\sum_{GG} = \sum G_j^2, \sum_{G\mu} = \sum G_j \cdot \mu_j, \alpha_i = \frac{\sum_{G\mu}}{\sum_{GG}}.$$

18. A system for controlling the stability of a vehicle according to claim 1, in which the two particular coefficients $A_p$, the coefficients A and B, are calculated by the following linear regression, applied to "n" measured or estimated points:

$$A^{Lin} = \frac{n \cdot \sum G \cdot \alpha - \sum G \cdot \sum \alpha}{n \cdot \sum G^2 - \left(\sum G\right)^2},$$

$$B^{Lin} = \frac{\sum \alpha \cdot \sum G^2 - \sum G \cdot \alpha \cdot \sum G}{n \cdot \sum G^2 - \left(\sum G\right)^2}.$$

19. A system for controlling the stability of a vehicle according to claim 18, in which $G^{Opt}$ is calculated as follows:

$$G^{Opt} = \frac{B^{Lin}}{A^{Lin}} \cdot \frac{1 - Invt}{1 - p \cdot Invt},$$

with $\alpha = A^{Lin} \cdot G + B^{Lin}$.

20. A system for controlling the stability of a vehicle according to claim 19, in which in addition the value of μ corresponding to $G^{Opt}$ is determined as follows:

$$\mu = \mu^{coeff\_lin \cdot G^{Opt}} \cdot (A^{Lin} \cdot G^{Opt} + B^{Lin}).$$

21. A system for controlling the stability of a vehicle according to claim 1, in which the two particular coefficients $A_p$, the coefficients A and B, are calculated by the following exponential regression, applied to "n" measured or estimated points:

$$A^{Exp} = \frac{n \cdot \sum G \cdot Ln(\alpha) - \sum G \cdot \sum Ln(\alpha)}{n \cdot \sum G^2 - \left(\sum G\right)^2},$$

$$B^{Exp} = \frac{\sum Ln(\alpha) \cdot \sum G^2 - \sum G \cdot Ln(\alpha) \cdot \sum G}{n \cdot \sum G^2 - \left(\sum G\right)^2}.$$

22. A system for controlling the stability of a vehicle according to claim 21, in which $G^{Opt}$ is calculated as follows:

$$G^{Opt} = \frac{Ln(Invt)}{p \cdot A^{Exp}}, \text{ with } \alpha = e^{A^{Exp} \cdot G + B^{Exp}}.$$

23. A system for controlling the stability of a vehicle according to claim 22, in which $\mu_{max}$ is determined as follows:

$$\mu_{max} = \mu^{coeff\_exp} \cdot G^{Opt} \cdot e^{A^{exp} \cdot G^{Opt} + B^{Exp}}.$$

24. A system for controlling the stability of a vehicle according to claim 5, in which the slope $\alpha_i$ is determined by direct calculation according to: $\alpha_i = F_i/\delta_i$.

25. A system for controlling the stability of a vehicle according to claim 5, in which the slope $\alpha_i$ is determined by carrying out a regression.

26. A system for controlling the stability of a vehicle according to claim 5, in which a linear regression is carried out according to:

$$\sum_{\delta\delta} = \sum \delta_j^2, \sum_{\delta F} = \sum \delta_j \cdot F_j, \alpha_i = \frac{\sum_{\delta F}}{\sum_{\delta\delta}}.$$

27. A system for controlling the stability of a vehicle according to claim 5, in which the two particular coefficients $A_p$, the coefficients A and B, are calculated by the following linear regression, applied to "n" measured or estimated points:

$$A^{Lin} = \frac{n \cdot \sum \delta \cdot \alpha - \sum \delta \cdot \sum \alpha}{n \cdot \sum \delta^2 - \left(\sum \delta\right)^2},$$

$$B^{Lin} = \frac{\sum \alpha \cdot \sum \delta^2 - \sum G \cdot \alpha \cdot \sum \delta}{n \cdot \sum \delta^2 - \left(\sum \delta\right)^2}.$$

28. A system for controlling the stability of a vehicle according to claim 27, in which $\delta^{Opt}$ is calculated as follows:

$$\delta^{Opt} = \frac{B^{Lin}}{A^{Lin}} \cdot \frac{1 - Invt}{1 - p \cdot Invt},$$

with $\alpha = A^{Lin} \cdot \delta + B^{Lin}$.

29. A system for controlling the stability of a vehicle according to claim 28, in which in addition $F^{Target}$ is determined as follows:

$$F^{Target} = F^{coeffLin} \cdot \delta^{Opt} \cdot (A^{Lin} \cdot \delta^{Opt} + B^{Lin}).$$

30. A system for controlling the stability of a vehicle according to claim 5, in which the two particular coefficients $A_p$, the coefficients A and B, are calculated by the following exponential regression:

$$A^{Exp} = \frac{n \cdot \sum \delta \cdot Ln(\alpha) - \sum \delta \cdot \sum Ln(\alpha)}{n \cdot \sum \delta^2 - \left(\sum \delta\right)^2},$$

$$B^{Exp} = \frac{\sum Ln(\alpha) \cdot \sum \delta^2 - \sum \delta \cdot Ln(\alpha) \cdot \sum \delta}{n \cdot \sum \delta^2 - \left(\sum \delta\right)^2}.$$

31. A system for controlling the stability of a vehicle according to claim 30, in which $\delta^{Opt}$ is calculated as follows:

$$\delta^{Opt} = \frac{Ln(Invt)}{p \cdot A^{Exp}}, \text{ with } \alpha = e^{A^{Exp} \cdot \delta + B^{Exp}}.$$

32. A system for controlling the stability of a vehicle according to claim 30, in which in addition $F^{Target}$ is determined as follows:

$$F^{Target} = F^{coeff\_exp} \cdot \delta^{Opt} \cdot e^{a^{exp} \cdot \delta^{Opt}} + A^{target}.$$

* * * * *